US005962774A

United States Patent [19]

Mowry et al.

[11] Patent Number: 5,962,774
[45] Date of Patent: Oct. 5, 1999

[54] REAL-TIME MONITORING OF VOLATILE ORGANIC COMPOUNDS USING CHEMICAL IONIZATION MASS SPECTROMETRY

[75] Inventors: Curtis Dale Mowry, Albuquerque; Steven Michael Thornberg, Peralta, both of N.Mex.

[73] Assignee: Sandia Corporation, Albuquerque, N.Mex.

[21] Appl. No.: 09/062,469

[22] Filed: Apr. 17, 1998

[51] Int. Cl.[6] .......... F16K 31/02; B01D 15/08; G01N 30/02

[52] U.S. Cl. .......... 73/23.37; 73/19.02; 73/23.42; 422/89; 436/161

[58] Field of Search .......... 73/23.37, 23.42, 73/19.02; 422/89; 436/161; 324/464; 96/102, 105; 95/85

[56] References Cited

U.S. PATENT DOCUMENTS

| | | | |
|---|---|---|---|
| 3,405,549 | 10/1968 | Finley | 73/23.1 |
| 3,471,692 | 10/1969 | Llewellyn et al. | 250/41.9 |
| 3,563,083 | 2/1971 | Benz | 73/23.1 |
| 3,712,111 | 1/1973 | Llewellyn | 73/23.1 |
| 3,933,047 | 1/1976 | Fowler | 73/421.5 |
| 4,373,549 | 2/1983 | Naleas et al. | 137/487.5 |
| 5,042,501 | 8/1991 | Kenny et al. | 128/719 |
| 5,045,694 | 9/1991 | Beavis et al. | 250/287 |
| 5,116,764 | 5/1992 | Annino et al. | 436/161 |
| 5,142,143 | 8/1992 | Fite et al. | 250/288 |
| 5,272,337 | 12/1993 | Thompson et al. | 250/288 |
| 5,339,673 | 8/1994 | Nakagawa et al. | 73/23.36 |
| 5,379,629 | 1/1995 | Müller | 73/23.27 |
| 5,447,556 | 9/1995 | Pleil et al. | 95/87 |
| 5,448,922 | 9/1995 | Kimbell et al. | 73/863.23 |
| 5,610,835 | 3/1997 | Dominquez et al. | 364/497 |
| 5,611,846 | 3/1997 | Overton et al. | 96/102 |
| 5,621,180 | 4/1997 | Simon et al. | 73/804.52 |
| 5,659,170 | 8/1997 | Da Silveira et al. | 250/287 |
| 5,703,359 | 12/1997 | Wampler, III | 250/288 |
| 5,811,059 | 9/1998 | Genovese et al. | 422/89 |

OTHER PUBLICATIONS

Dearth, et al, *On–Line Measurement of Benzene and Toluene In Dilute Vehicle Exhaust by Mass Spectrometry,* Environ. Sci. Technol., vol. 26, No. 8, 1992.

*Primary Examiner*—Hezron Williams
*Assistant Examiner*—J. David Wiggins
*Attorney, Agent, or Firm*—George H. Libman

[57] ABSTRACT

A system for on-line quantitative monitoring of volatile organic compounds (VOCs) includes pressure reduction means for carrying a gaseous sample from a first location to a measuring input location maintained at a low pressure, the system utilizing active feedback to keep both the vapor flow and pressure to a chemical ionization mode mass spectrometer constant. A multiple input manifold for VOC and gas distribution permits a combination of calibration gases or samples to be applied to the spectrometer.

14 Claims, 2 Drawing Sheets

REAL-TIME MONITORING OF VOLATILE ORGANIC COMPOUNDS USING CHEMICAL IONIZATION MASS SPECTROMETRY

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

Photolithography is used in the production of semiconductor devices to add layers of polymeric material to a silicon wafer and to produce circuit paths within these polymers. Many volatile and non-volatile chemicals are utilized in this process, including solvents, polymer building blocks and other reactive substances. Production of low defect devices at high yield requires extensive quality assurance and quality control activities.

Volatile organic compound (VOC) emission to the atmosphere is a major concern of semiconductor manufacturing industries, research laboratories, the public, and regulatory agencies. Historically, focus has been on cleaning waste VOCs from the manufacturing plant's "air" emissions through the use of scrubbers and filters. Some industries are now seeking ways to reduce emissions by reducing VOCs at the point of use (or generation) to decrease the costs associated with removing VOCs from the air. For successful point of use reduction, VOC measurement methods must be developed for on-line process monitoring. These methods must meet several performance specifications such as rapid response time, continuous detection, lower limit of detection, and speciation of the VOCs detected. Specie-specific information is needed since the chemicals used have different chemical properties as well as different levels at which they become a regulatory concern.

A variety of methods and instrumentation can be used to monitor airborne VOCs depending on the application and the equipment available. Common methods may utilize gas chromatography (GC), mass spectrometry (MS), fourier transform infrared spectrometry (FTIR), chemical specific sensors, or hyphenated techniques including gas chromatography/mass spectrometry (GC/MS). "Protocol for Equipment Leak Emission Estimates," U.S. Environ. Prot. Agency, Off. Air Qual. Plann. Stand., [Tech. Rep.] EPA (1993), EPA-453/R-93-026, 257 pp., provides an overview of many methods for monitoring airborne VOCs and field portable GCs.

A system for gaseous VOC monitoring of a lithography process must meet several analytical and physical criteria in order to accurately characterize the emissions. The VOCs in the vapors in the ventilation system are the compounds measured by this invention. Therefore, the analytical requirements of the system, based on the lithography process knowledge and limited flame ionization detector (FID) data, include the ability to 1) detect the particular airborne VOCs used in lithography, 2) attain detection limits for these VOCs below 10 ppm by volume, 3) obtain concentration information for each analyte in the gas stream and 4) acquire at least 1 data scan per second.

Several analytical techniques were examined to assess their ability to meet the requirements described above. Meeting the analytical requirements was the highest priority of the system requirements. The techniques evaluated were gas chromatography (GC), mass spectrometry (MS), GC/MS, $\mu$GC, fourier transform infrared spectrometry (FTIR), and FID. Although each technique is capable of detecting lithography VOCs, only MS and FID met or exceeded both the detection limits and data acquisition rate requirements. However, FID could only meet the data acquisition rate requirement when used without chromatographic separation, which does not allow for quantitation of individual analytes. Only mass spectrometry met all the analytical and physical requirements.

Many mass spectrometers can be operated either in electron ionization (EI) or chemical ionization (CI) mode. In EI, electrons generated by a hot filament ionize and fragment the analyte molecules. The ionized molecules or fragments are then mass analyzed. Typically, electron ionization is a very energetic process, which causes a high degree of fragmentation of the analyte molecules and leaves few, if any, molecular ions for detection. Identification and quantitation is performed using one or more of the fragment ions.

Chemical ionization differs from electron ionization in that reagent molecules (not electrons) ionize the analyte molecule. For example, for methane CI, the ionizing reagent molecule is $CH_5^+$. Methane gas is ionized by electrons and interacts with neutral methane molecules to form a number of products, one of which is $CH_5^+$. A proton is transferred from $CH_5^+$ to the sample molecule to form an $[M+H]^+$ ion where M is the molecular weight of the sample molecule. Therefore, the parent ion in chemical ionization appears in the mass spectrum at a mass which is 1 greater than the molecular weight of the neutral analyte molecule.

Chemical ionization is much softer (less energetic) than electron ionization; this affords significant advantages for airborne VOC measurement when mixtures are present. The CI analyte molecular ion signal is more intense and fewer fragment ions are produced than with EI, which minimizes the mass spectral interferences and causes CI to be more sensitive than EI for many compounds.

Because a mass spectrometer counts the number of ions over a period of time, quantitative measurements require that the MS be calibrated against a known source operating at the same pressure as the source to be tested. It is difficult to use mass spectrometry for on-line VOC measurements because various sources of VOCs operate at different pressures, and these pressures change during operation due to ventilation or barometric changes, which means the MS must be recalibrated with each pressure change.

SUMMARY OF THE INVENTION

It is an object of this invention to provide real-time monitoring of VOCs in gaseous environments.

It is another object of this invention to use chemical ionization to monitor VOCs from lithography processes at different pressures.

It is also an object of this invention to use active feedback to control the input pressure of a system for real-time monitoring of VOCs in variable gaseous environments.

Additional objects, advantages, and novel features of the invention will become apparent to those skilled in the art upon examination of the following description or may be learned by practice of the invention. The objects and advantages of the invention may be realized and attained as particularly pointed out in the appended claims.

To achieve the foregoing and other objects, and in accordance with the purpose of the present invention, as embodied and broadly described herein, the present invention may comprise a system for on-line measurement of volatile organic compounds (VOCs) in a gaseous sample comprising a measuring device such as a mass spectrometer for measuring the amount of VOCs in the sample, the device having a measuring input maintained at a low pressure. This device has an input tube for carrying the gaseous sample from a first location to its input, the tube reducing the pressure from a first value at said first location to the low pressure, the first value being at least 1000 times greater than the low pressure. An elongated passage is provided for carrying the gaseous sample from a device under test to the first location and for keeping the gas flow and pressure at the first location at predetermined constant values.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
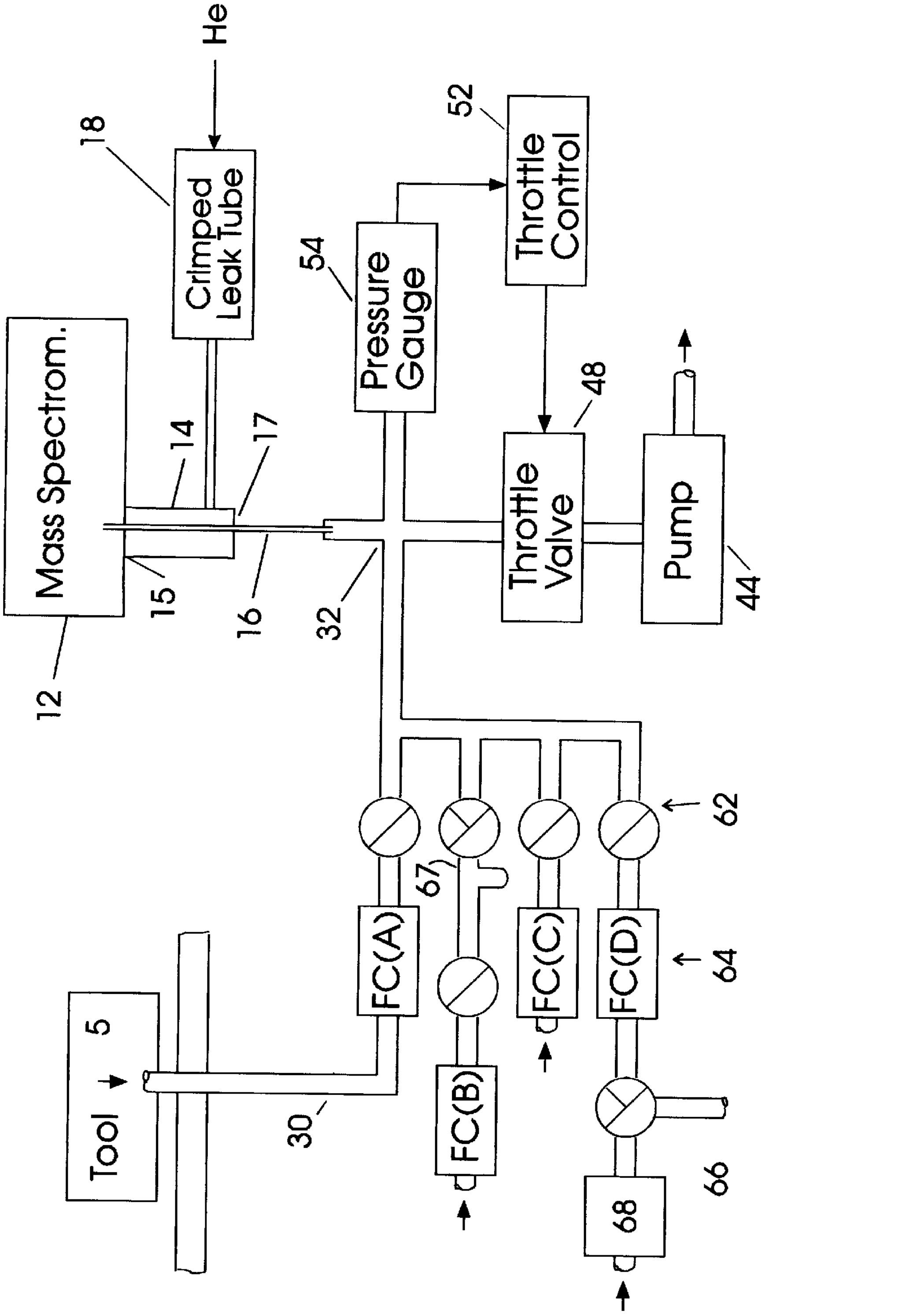
FIG. 1 shows a schematic representation of a preferred embodiment of this invention.

In accordance with a preferred embodiment shown in FIG. 1, an on-line volatile organic compound monitoring system 10 may include a chemical ionization mass spectrometer 12 connected to receive VOC from at least one operating chemical process such as a lithography tool 5. The connection must provide an accurate representation at MS 12 of the gases at tool 5, while accounting for the greatly different pressures at these locations. Typically, tool 5 operates at about room atmosphere, a pressure of several hundred Torr, while MS 12 operates at less than one thousandth of a Torr. Furthermore, as discussed hereinafter, the connection must keep the pressure and flow into MS 12 constant, even though the input pressure and flow may vary.

To accomplish this connection, tubing 30 (typically flexible plastic about 5 mm (3⁄16") inside diameter) extends on the order of 20 m from tool 5, through the subfloor 7 of the fabrication facility where lithography tool 5 is utilized, through a flow controller 64(A) to a first connection port of distribution manifold 32. One embodiment of spectrometer 12 includes a 1.5 mm diameter stainless steel vacuum housing 14 having an open end 15 which provides the only communication to the ion source region of MS 12, and a closed opposing end 17 through which a short length of pressure reducing tube 16 extends from the ion source region to a second connection port of distribution manifold 32. Tubing 16 may be a tubing of any size that provides for restricting flow as well known in the art to drop the pressure across tube 16 to the low operating pressure of MS 12. However, tubing 16 is preferably a capillary of sufficiently small diameter to provide resistance to the flow of gas from tool 5 to MS 12. In one test of the invention, capillary tube 16 was a .25 mm inside diameter uncoated fused silica tube having a length on the order of 1 meter. A metering valve (not shown) between manifold 32 and MS 12 was also used with capillary tube 16 in one test of the invention, but such a valve was found not to be a requirement.

Optionally, a source of buffer gas such as helium may also be applied to vacuum housing 14 through a fixed orifice 18 to limit flow. The sample and buffer combine within the ion source region of spectrometer 12.

In operation, lithography tool 5 generates vapors in a sealed container as is well known in the art. These vapors are exhausted through conventional exhaust lines running under the fab subfloor 5, with the pressure in the exhaust lines typically being on the order of 700 Torr. For qualitative measurements of VOCs at tool 5, it is sufficient to provide a pump 44 connected to a third connection point of distribution manifold 32 to draw gases from tool 5 to distribution manifold 32. Mass spectrometer 12 operates at an internal pressure of between $10^{-3}$ and $10^{-5}$ Torr, so gases are drawn into the MS from manifold 32.

The aforementioned equipment cannot provide for quantitative measurements due to naturally occurring variations in the system. The measured quantity of VOC is a function of the amount of VOC that flows through tube 16 into MS 12, which amount is a function of the pressure and flow of gas at the input end of capillary tube 16. Pressure may randomly change as the conditions change within tool 5, as the atmospheric pressure changes, and as the device is connected to different tools 5. The flow may change as different processes occur within tool 5 and as equipment comes on or off line in parallel with tool 5. Furthermore, the system must be calibrated with a constant source of material at the same pressure and flow as tool 5.

In accordance with this invention, additional equipment is provided to ensure that the pressure and flow at the input to MS 12 remains constant. Mass flow controller 64(A) provides a constant flow rate at its output so long as its input is at a greater flow rate and there is a sufficient pressure difference between input and output. For a test of this embodiment, controller 64(A) was an MKS Instruments, Andover, Mass., type 1359C device that was set to provide a controlled flow of 2000 sccm (standard cubic centimeters per minute). Setpoints and readout were achieved with a four channel readout, MKS type 247C (not shown) connected to controller 64(A). Sufficient flow through controller 64(A) was ensured by pump 44, a direct drive mechanical type 2021 pump from Alcatel Vacuum Products Inc., Hingham, Mass.

Pressure at manifold 32 was maintained at a constant pressure of about 400 Torr using a pressure gauge 54 connected to a fourth connection point of distribution manifold 32 to measure the pressure, a throttle valve 48 connected between manifold 32 and pump 44 to adjust the pressure and a throttle valve controller 52 controlled by a signal from pressure gauge 54 to adjust the position of valve 48. The value of 400 Torr was a result of the equipment used in the disclosed embodiment. Any pressure at manifold 32 which is less than the pressure at tool 5 (or any other input likely to be attached to the system), which is significantly greater than the operating pressure of MS 12, and which supports a constant flow and pressure as described herein, is acceptable. As a practical matter, it becomes more difficult to maintain a constant pressure at lower pressures.

For the test, gauge 54 was an MKS Instruments model 690A13TRC; valve 48 was an MKS Instruments type 270, model 253A-1-2CF-1; and controller 52 was an MKS Instruments type 252. The manifold 64 was heated to approximately 50° C. using resistive heat tape to prevent condensation of the organic compounds under test. Depending on the compounds, the entire system may have to be heated, as is well known in the art.

A sampling flow of 2000 sccm was used for each sample line to monitor individual tools. Sample flow was diluted with room air, dependent upon the signal observed, using a second flow controller. For example, a total flow of 4000 sccm (flow controllers 64(A) and 64(B) open, set for 2000 sccm each with 64(C) and 64(D) closed), diluted the exhaust by a factor of two. Different inlet pressures (400 and 500 torr) were also utilized to affect signal intensity.

For the tests, MS 12 was an INCOS XL mass spectrometer (Finnigan Corp., San Jose, Calif.). The instrument scanned a mass range of 50–175 amu at the rate of one scan per 0.8276 seconds. Source and transfer line temperatures were set at 120° C.

Figure 2:
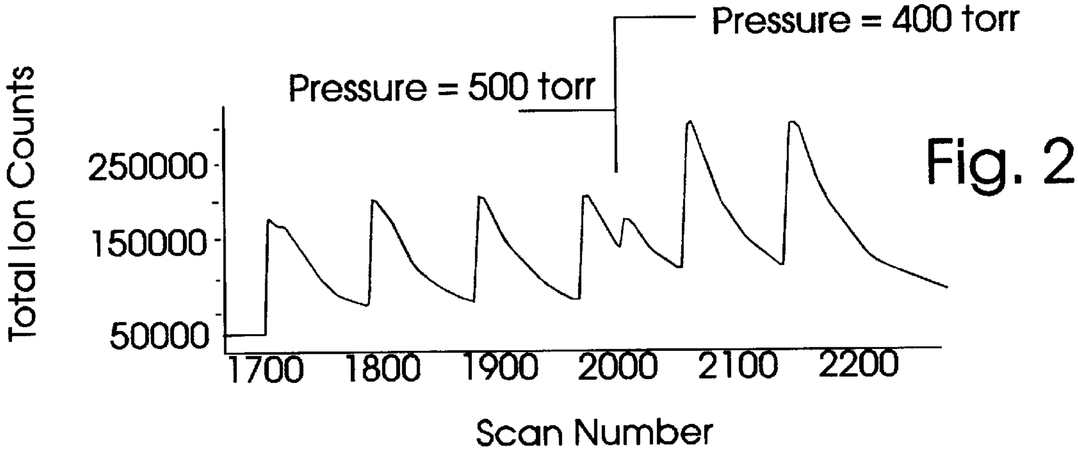
FIG. 2 shows the effect of pressure change on measurements of the invention.

FIG. 2 shows the effect of a change in inlet pressure on quantitative measurements. When the inlet pressure at distribution manifold 32 dropped from 500 torr to 400 torr during processing of the fourth of six wafers, the total ion count jumped significantly. This jump occurred because a change in pressure affects the quantity of sample entering MS 12, as well as the pressure inside the MS, which affects the efficiency at which analytes are detected. The drop in pressure reduced the amount of sample entering the MS, which increased the detection efficiency (or sensitivity) of the device and yielded a larger signal.

The feedback system of the invention is utilized to prevent such changes.

Figure 3:
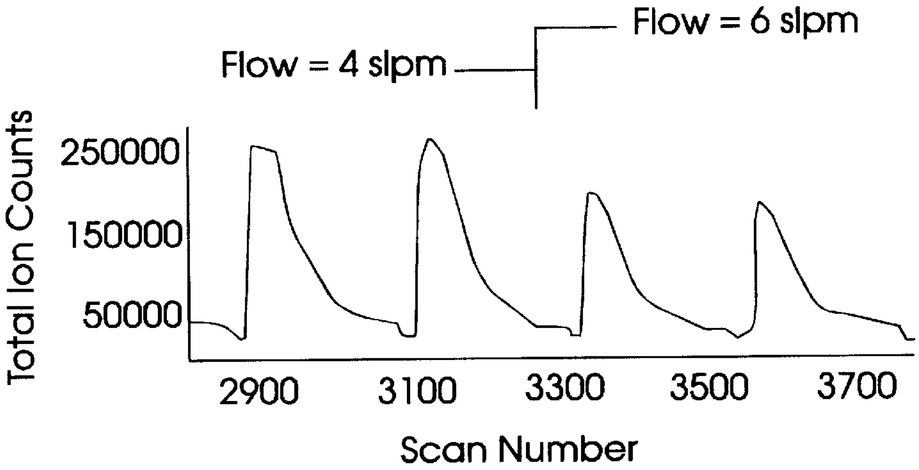
FIG. 3 shows the effect of flow change on measurements of the invention.

In a similar manner, FIG. 3 shows that a change in flow from four to six standard liters per minute caused a significant reduction in total ion count, because a constant fraction of the total flow enters MS 12, and the stream from tool 5 had been diluted by 50% with the extra flow coming from the room air, not the tool.

As further illustrated in FIG. 1, this invention permits the use of the expensive mass spectrometer with a plurality of inputs. An input manifold 60 includes four parallel input arms or paths (A)–(D), with each input path containing a flow controller 64 similar to controller 64(A) and a gate valve 62 to regulate whether or not gas passes through that arm. (Specific arms, and components of specific arms, are identified by a letter (A)–(D) representing each of the four arms displayed in FIG. 1. Statements that apply to all arms will not be designated by a letter.) Additional input tubes (not shown) corresponding to tube 30 may connect each of controllers 64(B) and 64(C) to different tools (not shown) in the fabrication facility.

For calibration purposes, the inputs of flow controller 64(D) is shown to be connected through a three way gate valve 66 to a source of air and to an acetone permeation tube 68. A permeation tube is a closed container filled with a relatively large amount of the desired analyte, such as acetone, in pure form which diffuses through the porous walls of the container at a known rate. The tube is often placed in an oven to ensure constant temperature. For the test, acetone permeation tube 68 (VTI, Oak Ridge, Tenn., model LPL-5-ACE-4MVCR-FV-FTV) was connected to the sampling manifold with a flow of 50 cc/min.

Input manifold 60 permits single or multi-component gas streams to be generated for calibration purposes. By connecting glass bubbling tube 67 to path (B), gases of different compounds may be generated and used to calibrate MS 12. In a test of the invention, quantitation was performed by monitoring a single mass for each source analyte. The signal intensity of the protonated molecular ion was monitored for acetone (m/z 59), isopropanol (m/z 61), and ethyl lactate (m/z 119) ; whereas the signal intensity of a fragment ion of HMDS (hexamethyldisilazane) (m/z 147) was monitored.

Protonated HMDS was observed, but was far less abundant. Both ethyl lactate and HMDS produce fragment ions that should be considered if additional compounds are to be monitored since they may overlap with peaks of other compounds. For example, the fragment ion of HMDS appearing at m/z 73 creates an interference for any analyte whose protonated molecular ion would appear at the same mass. In mixture analysis the result could range from a small measurement bias to a false positive. In general, the less fragmentation present and the higher the m/z value monitored, the lower the probability of mass spectral interferences.

To utilize the invention in the environment for which it is designed, a semiconductor production line, the major components of each photolithography blend were detected by GC/MS and retention times tabulated for all components under these GC conditions. The major ions observed for individual components, i.e. their mass spectral "signatures", were also tabulated. Samples were then collected using adsorption tubes on-site and analyzed to determine the approximate concentration levels of photolithography blend components present during wafer processing. Despite difficulties in determining detection limits in Cl/MS, comparison of on-site data and GC/MS analysis of laboratory-generated exhaust flows allowed the sampling manifold and Cl/MS instrumentation to be optimized for on-line analysis.

One goal of this invention is to determine the potential of Cl/MS to perform as an end-point detector in various operations. Detection and measurement of organics exhausted during spin-coat, soft-bake, and post-exposure bake tool (PEB) operations has been demonstrated. Changes in the signal of one component observed in the PEB exhaust with changes in exposure conditions and PEB oven temperature demonstrate the capabilities of Cl/MS exhaust monitoring.

Figure 4:
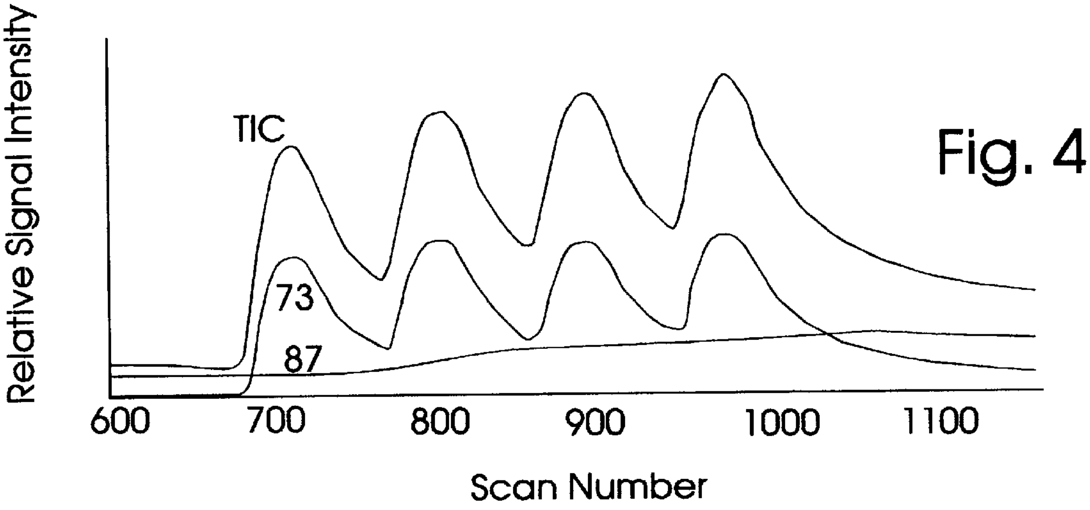
FIG. 4 shows ion intensities vs. scan number for APEX coat of four wafers using this invention.

For one test, exhaust flow from two spin-coater cups were individually monitored during standard wafer coating procedures. The first procedure coated APEX (a photoresist chemical manufactured by Shipley, Marlborough, Mont.) followed by a backside wash of GBL (a rinsing chemical manufactured by Olin Stamford, Conn., whose major ingredient is 4-butyrolactone). FIG. 4 plots with a common y-axis the total ion counts (TIC, sum of all ions) in addition to selected ion plots for m/z 73 (APEX) and m/z 87 (GBL) versus scan number. Four wafers were coated using the nominal parameters of a 6 second dispense time, 30 second casting time and 15 second backside rinse. Initially almost no APEX and only a small level of GBL was present. APEX present in the spin-coater and/or sampling line did not drop back to baseline before the next wafer was coated, and remains elevated during the following wafers. One and a half minutes after the last wafer, APEX was still present. An acetone calibration was performed after the APEX coat and used to calculate the APEX concentration (in acetone equivalents) present at each peak maximum (see Table 1). The less volatile GBL was observed to increase slowly with time (see m/z 87, FIG. 2), reaching a maximum concentration of 0.8 ppm (in acetone equivalents). Depletion of GBL began to occur 1.5 minutes after the last wafer.

Based on the preliminary data, the APEX ion (m/z 73, fragment of PGMEA) and the protonated molecular ion of GBL (m/z 87) were chosen for quantitation. These ions were of greatest abundance in the spectra of these compounds and therefore would allow the lowest detection limits.

TABLE 1

APEX peak width and concentration at peak maximum (in acetone equivalents).

| APEX peak # | peak width (seconds) | peak max. (ppm) (acetone equivalents) |
|---|---|---|
| 1 | 71 | 2.5 |
| 2 | 75 | 2.2 |
| 3 | 71 | 2.0 |
| 4 | 68 | .2.2 |

The particular sizes and equipment discussed above are cited merely to illustrate a particular embodiment of this invention. While the invention is illustrated measuring VOCs from a semiconductor processing tool, it may be utilized to monitor many different processes and many different compounds. It is contemplated that the use of the invention may involve components having different sizes and shapes as long as the principles of the invention are followed. It is intended that the scope of the invention be defined by the claims appended hereto.

We claim:

1. A system for real-time quantitative measurement of volatile organic compounds (VOCs) in a gaseous sample comprising:

means for measuring the amount of VOCs in the sample, said means having a measuring input maintained at a low pressure;

pressure reduction means for carrying the gaseous sample from a first location to said measuring input, said pressure reduction means reducing the pressure from a first value at said first location to the low pressure, the first value being at least 1000 times greater than the low pressure;

input means for carrying the gaseous sample from a device under test to said first location, said input means including flow adjustment means for keeping the gas flow and pressure at said first location at predetermined constant values.

2. The system of claim 1 wherein said means for measuring consists of a chemical ionization mass spectrometer.

3. The system of claim 2 wherein said pressure reduction means comprises a reducing tube extending from the first location to the input of said mass spectrometer.

4. The system of claim 3 wherein said reducing tube consists of a capillary tube.

5. The system of claim 3 wherein said input means comprises an input tube extending from the device under test.

6. The system of claim 4 wherein said input means further comprises a pump for drawing the gaseous sample through said input tube to the first location.

7. The system of claim 5 wherein said input means further comprises a distribution manifold at the first location having a plurality of connection ports in gaseous communication, wherein one port is connected to receive the sample from said input tube, a second port is connected to said reducing tube, and a third port is connected to said pump.

8. The system of claim 7 wherein said input means further comprises an adjustable valve connected between said pump and said third port of said distribution manifold, and means responsive to the pressure at said first location for adjusting the amount of gas passed through said adjustable valve, wherein the pressure at said distribution manifold is maintained at the first value.

9. The system of claim 8 wherein said means responsive to the pressure consists of a pressure detector at said first location connected to a controller for adjusting said valve in response to the detected pressure.

10. The system of claim 5 wherein said input means further comprises a flow controller in series with said input tube for maintaining the gas flow through said input tube at a constant value.

11. The system of claim 7 further comprising an input manifold having a plurality of input arms connected to a common output port, said input tube being connected to one of said input arms, said common output port being connected to said one port of said distribution manifold, each of said input arms including gate means for selectively passing or preventing flow through said common output port.

12. The system of claim 11 further comprising a flow controller between said output port and said distribution manifold for maintaining the gas flow through said input tube at a constant value.

13. The system of claim 11 wherein each input arm includes a flow controller in series with said gate means for maintaining the gas flow through said each input arm at a constant value.

14. The system of claim 13 wherein one of said input arms is connect to a permeation tube, wherein air under pressure passes analyte from said permeation tube to said input manifold for calibrating said mass spectrometer.

* * * * *